United States Patent [19]
Skinner et al.

[11] 3,963,099
[45] June 15, 1976

[54] HYSTERETIC ENERGY ABSORBER

[75] Inventors: Robert Ivan Skinner; Arnold John Heine, both of Wellington, New Zealand

[73] Assignee: New Zealand Inventions Development Authority, Wellington, New Zealand

[22] Filed: May 8, 1975

[21] Appl. No.: 575,745

[52] U.S. Cl. .................................. 188/1 C; 52/393
[51] Int. Cl.² ............................................ F16F 7/12
[58] Field of Search ........... 188/1 B, 1 C, 1 R, 129; 52/393; 248/21, 358 R; 267/154

[56] References Cited
UNITED STATES PATENTS

| | | | |
|---|---|---|---|
| 3,124,215 | 3/1964 | Fox et al. | 188/1 C |
| 3,283,857 | 11/1966 | Platus et al. | 188/1 C |
| 3,762,505 | 10/1973 | Morse | 188/1 C |

*Primary Examiner*—Duane A. Reger
*Attorney, Agent, or Firm*—Holman & Stern

[57] ABSTRACT

A cyclic absorber of energy in massive quantities. It is suitable for installation between two parts of a structure that would be caused to move relative to each other by earthquakes or heavy winds. Energy is absorbed by the cyclic, flexural deformation into the plastic range of a main beam which may be a single or double cantilever. Strain of the main beam may be distributed and the capacity of the device increased, by short auxiliary cantilevers initially in contact with the main beam.

10 Claims, 11 Drawing Figures

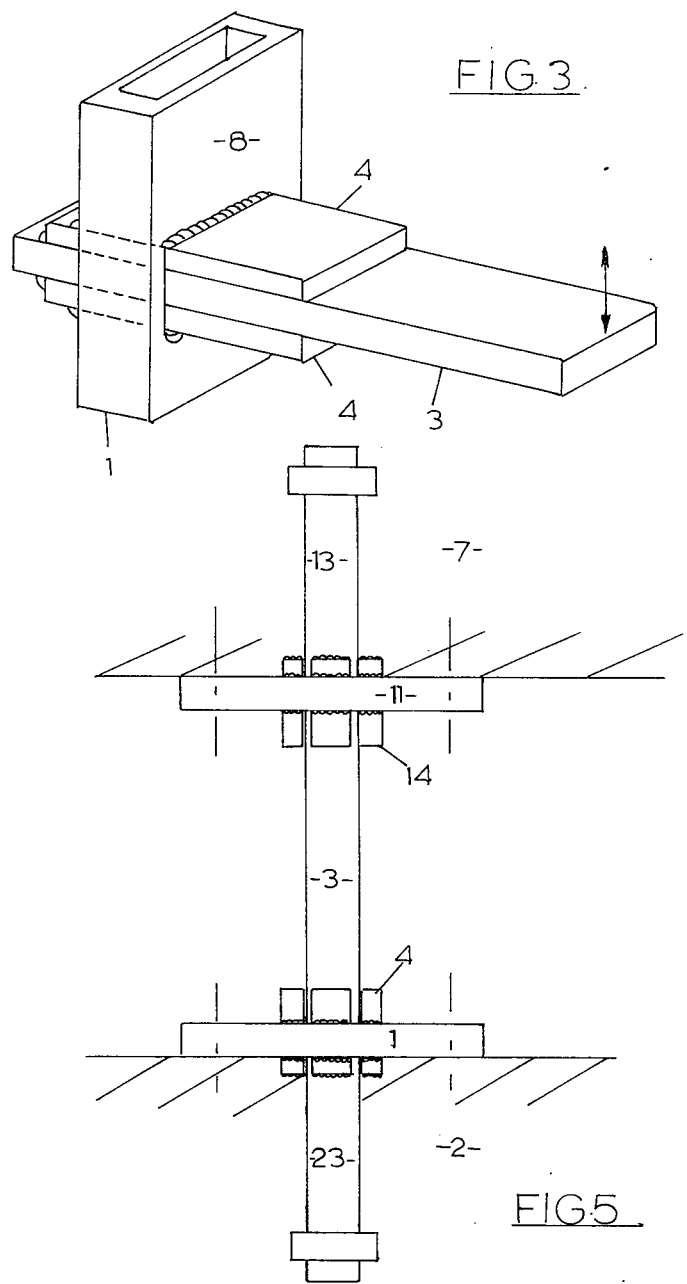

3,963,099

HYSTERETIC ENERGY ABSORBER

BACKGROUND OF THE INVENTION

FIELD OF THE INVENTION

This invention relates to a hysteretic energy absorber.

There are circumstances in which it is desired to decrease the application of energy to a body or structure. In some circumstances this may be done by springs, but only when the elastic restoration of the energy can be dealt with. Various devices such as shock absorbers or viscous dampers are used when for some reason the energy must not be restored.

A particularly troublesome situation arises in preventing the cyclic forces imposed by earthquakes from damaging buildings and their contents. The present invention arose in the first place as a means of providing a damper to be connected between the base of a structure and the foundations below the structure. The structure was to be supported by a system, interposed between its base and its foundations, which allowed substantially free horizontal motion of the base. A combination of a flexible base-support system and a set of large-capacity energy absorbers of suitable characteristics would provide, for most structures, a substantial measure of protection from severe earthquake forces, while at the same time preventing frequent troublesome motions.

Common types of energy absorber are not satisfactory. In the first place, those which would absorb enough energy to protect a building in a severe earthquake would be so big as to be unusable. Velocity dampers are unsatisfactory, since they would do nothing to prevent the slow movement of the building. Hydraulic dampers might be made big enough, but they would allow drift from, for instance, wind loads, they would be expensive, and their upkeep would demand frequent attention.

SUMMARY OF THE INVENTION

It is an object of the present invention to provide an energy absorber that will go some way to meet the requirements stated above, and to avoid the difficulties of existing types of energy absorber, or will at least provide the public with a useful choice.

A property of low-carbon mild steel when stressed beyond the elastic into the plastic regime provides the basis for a new type of energy absorber. If during stressing of a piece of steel displacement is plotted against load, the line which is at low stresses straight becomes curved when the stress is high. The line followed during the relief of stress is quite distinct from that during stressing, and if a cyclic stress into the plastic region is applied, a closed curve is followed. This is known as a hysteresis curve, and the type of energy absorber which uses this property of steel (the same applies to many other solid materials, but low-carbon steel is especially favourable) is known as a hysteretic energy absorber. The name applies only when the energy to be absorbed is cyclic.

An absorber of this type has already been described and claimed in United States Letters Patent to Skinner, No. 3,831,924 issued August 27, 1974, "Torsional Energy Absorber". It uses the hysteretic property of steel when stressed mainly in torsion, and has two limitations. In conformation it is essentially 3-dimensional, so that it may be relatively bulky and cannot, for instance, be fitted within a sandwich wall, and it will deal with forces applied along only one line. The hysteretic energy absorber to be described later has two general embodiments. In both, the device extends principally in two dimensions and can be fitted within a sandwich wall if required, and in one forces applies in any direction in a plane can be dealt with.

To protect a building, a hysteretic energy absorber capable of operating for motion in any horizontal direction would be particularly effective. There are other applications for which an absorber acting along a single line is appropriate; for example, the two ends of a bridge deck may themselves be designed to allow motion along only the deck's length. Earthquake resistance of the bridge structure might be increased by connecting a hysteretic energy absorber for longitudinal operation between one end of the bridge deck and the abutment.

A further application of energy absorbers is the protection of equipment within buildings such as apparatus racks (which might be 10' high and be relatively heavily loaded) or shelves and the like, from being overturned or wrenched from their foundations, or fractured by earthquakes. Such structures can be anchored to the floor. They can also be anchored to walls by tie rods but it is always possible that the walls will not move in phase with the floor, so that the tie rods might themselves impose forces on articles they were intended to protect. Protection would be possible if a plastic energy absorber could be incorporated in the tie rods, or between the tie rods and the supported equipment.

Accordingly the invention may be said to consist of a cyclic energy absorber designed to be interposed between first and second members of a structure which are caused by in-coming energy to move relative to each other, said energy absorber comprising in combination:

an anchor adapted to be connected rigidly to a first member of the structure;

a main beam rigidly connected at one peripheral plane to said anchor;

loading means connecting a second member of the structure to the main beam at a point remote from the connection to said anchor so that relative to-and-fro motion between said first and second member of the structure causes said main beam to form cyclically in flexure into the plastic range.

The invention consists in the foregoing and also envisages constructions of which the following gives examples only.

BRIEF DESCRIPTION OF THE DRAWING

One preferred form of the invention will now be described with reference to the attached drawings, in which:

FIG. 3 shows schematically a single-cantilever hysteretic energy absorber for action along one line in the condition it would have before severe deformation, FIG. 5 shows schematically a development of the device of FIG. 2; a beam intended as a multi-directional, hysteretic energy absorber is equipped with two moment-resisting anchors, one attached to the base of the building and the other to a foundation.

DESCRIPTION OF THE PREFERRED EMBODIMENTS

Figure 1:
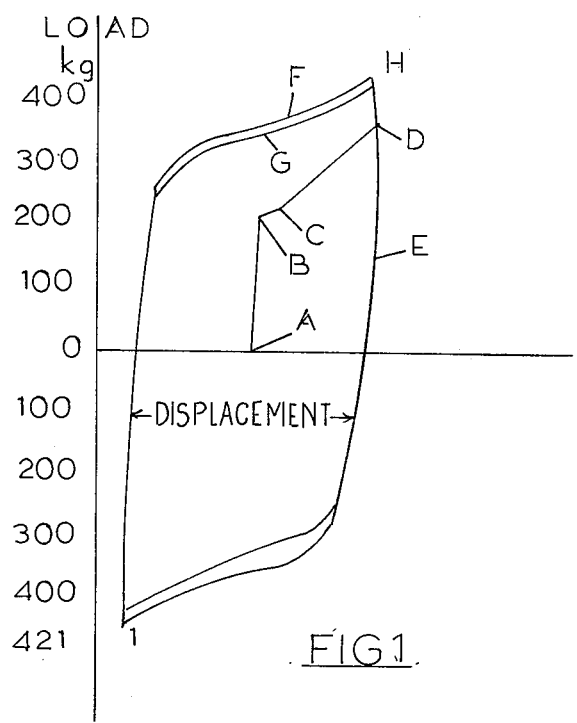
FIG. 1 shows a hysteresis loop determined experimentally for a low-carbon mild steel.

FIG. 1 illustrates a basic property of low-carbon mild steel. Other materials have a similar property, but low-carbon mild steel is convenient to use. When a sample of such steel is subjected to a number of cycles of alternating stress, it is possible to plot load against the displacement of some point on the specimen. In the beginning, the steel is at the point A and as the load is applied there is elastic displacement to point B. At this point there is yield and as the load is increased the displacement per unit of additional load is much greater until the point D is reached, at which the stress is slowly reduced. The curve then followed is D-E and not D-B-A. When the stress is reversed the point I is finally reached. If now the stress is once more reduced and reversed, the curve I-G-H is followed. Subsequent cycles of alternating load will follow the closed curve H-E-I-G-H with variations such as are shown at G-F. The area within the closed curve is the energy absorbed per cycle and for low-carbon mild steel the energy absorbed per cycle per pound weight is high.

In a preferred form of the invention, the basic component of the energy absorber is an energy absorbing beam which is attached to a rigid support by a moment-resistant anchor. Energy is absorbed in the fashion disclosed in FIG. 1 when the beam is deformed by a transverse load applied to its free end. The beam can be either single or composite, and may not be all of the same material.

The anchor includes guide beams which are fixed in place against but are not attached to faces of the main beam. This moment-resisting anchor increases substantially the energy absorbing capacity of the beam during deformation.

Figure 2:
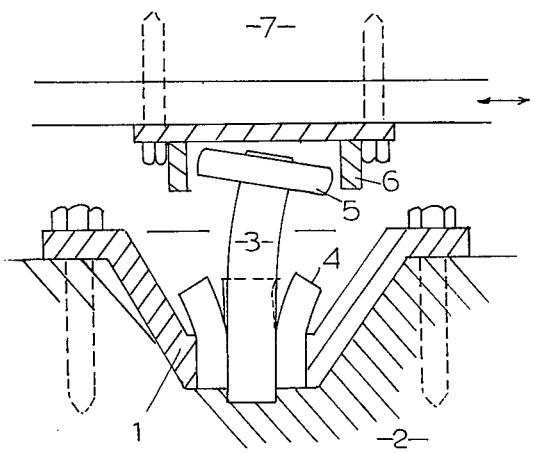
FIG. 2 shows partly in cross-section a schematic representation of a multi-directional, cantilever, flexural, hysteretic energy absorber as it might be fitted between the base and foundation of a building after subjecting to a major earthquake.

The first embodiment of the invention is shown in FIG. 2. The dished plate 1 is a moment-resisting anchor. Its precise form is unimportant. It is rigidly connected to a body which in this case is a foundation 2. An energy absorbing beam 3 (here shown deflected) is rigidly attached to the anchor 1. Around its base are guide beams 4. These also are rigidly attached to the anchor and are arranged to have their long axes parallel to the axis of 3; before heavy stressing they are in contact with the beam 3. Beam 3 may be cylindrical or prismatic with any number of sides, from 3 upwards. For any prismatic form of the beam, the cross-section should be as symmetric as possible, in order to present substantially the same resistance to bending for all loading directions perpendicular to the beam axis. If the beam 3 has flat sides it is to be expected that there will be a guide bar 4 for each side. When the beam 3 is cylindrical guide bars 4 may be rods, flat strips, a cylinder or segments of a cylinder replacing the strips shown at 4 in FIG. 4. Guide bars of various lengths have been tested and it is believed that the optimum length is approximately one-third of the length of the main beam between its anchorage and the point at which force is applied. There should be as little circumferential spaced unused between the guide bars as possible. Their optimum thickness is 0.5 to 1.0 times the thickness of the main beam.

At the head of the main beam 3 is the means by which a cyclic load is imposed on it. In FIG. 2, 5 is a head whose perimeter is a great circle zone of a sphere; 6 is a squat cylinder attached to the base 7 of the building. The clearance between 5 and 6 is small so that as soon as the building moves, cylinder 6 causes a load to be imposed on the flexural beam 3. The maximum rotation to be expected of beam 3 is in the neighbourhood of 15°. The depth of cylinder 6 should correspond with this, with a suitable allowance.

When an earthquake moves the foundation, 5 and 6 make contact and beam 3 will bend elastically. It must be understood that the movement between the building 7 and the foundation 2 is purely relative. If the relative movement embodies a great enough force, the beam 3 will be deflected out of its elastic range into its plastic range and it will move the guide beams 4 in front of it. When a heavy alternating force is applied, the main beam suffers alternating elastic deformation, together with alternating plastic deformations. The guide beams suffer alternating elastic deformation and unidirectional plastic deformations. That is to say, after the first large excursion the guide beam will be left in the curved state shown in FIG. 2.

The guide beams contribute several features to the moment-resisting anchor.

1. They increase the volume throughout which plastic deformations occur in the main deformable beam.

2. They prevent the concentration of large plastic strains by increasing the radius of curvature of the main beam when deformed.

3. They apply a rolling action to the surface of the main beam, so long as they have a width at least as great as that of the main beam. This induces a compressive stress in the superficial layers of the deforming beam. It has been shown in a number of scientific papers (see for instance Moore H.L. (1947) and A.S.T.M. (1941) that such compressive stress leads to a reduction in tensile stress in the vulnerable surface layer, and hence to an improvement in the fatigue strength of the specimen.

4. They absorb energy.

With the main beam 3 at 3 inches in length and ¼ inch in thickness and with guide beams 4 projecting 1 inch from the anchor, it has been found that after a number of excursions into the plastic region, further excursions cause contact between the beam 3 and guide beam 4 over a ½ inch length. As the beam 3, after many cycles of stress, approaches failure it is found that cracks are distributed over this ½ inch length. When there are no guide beams the same energy is available for forming cracks confined to the immediate neighbourhood of the anchor, so that the useful life of the beam 3 is much shortened. The guide beams increase substantially the number of cycles of deformation for any given amplitude of deformation which can be applied to the beam before failure, so that the beam has an increased capacity for absorbing energy.

FIG. 3 shows a variant of the absorber of FIG. 2 and in addition shows a varied method of mounting that could also be applied to the device for FIG. 2. This method of mounting will be discussed later.

The numbering of FIG. 3 corresponds with the numbering of FIG. 2. 1 is an anchor and the body to which it is attached is not shown and 3 is again the deformable beam and in this embodiment it is transformed into a body of lower symmetry, a strip. As a result, it is suitable for dealing with forces only in the directions shown by the arrows — it has a single line of action as an absorber. Guide bars 4 are fitted only on the two main faces. The linkage for applying the force to the end of bar 3 is not shown. It may be an analogue of parts 5 and 6 of FIG. 2, but because of the use to which this form can be applied, it may also be a conventional linkage.

Clearly, the anchor 1 of FIG. 3 is different from the anchor of FIG. 2. It consists of a rectangular tube that is slotted on both faces to take both guide bars and main beam. The guide bars are welded to both faces of the tube. The main beam is welded to the guide bars only on the face remote from the applied load.

Guide bars provide a region of decreasing fixity between the anchor and the main beam 3 of both FIGS. 2 and 3, the region extending from the face of the anchor 1 to the part of the main beam which is clear of the guide bars where the main beam is subjected to severe bending deformations. It is believed that the arrangement of FIG. 3 provides a second region of decreasing fixity for the main beam between its welds to the guide bars on the reverse face and the front face 8 of the tubular anchor.

Figure 4:
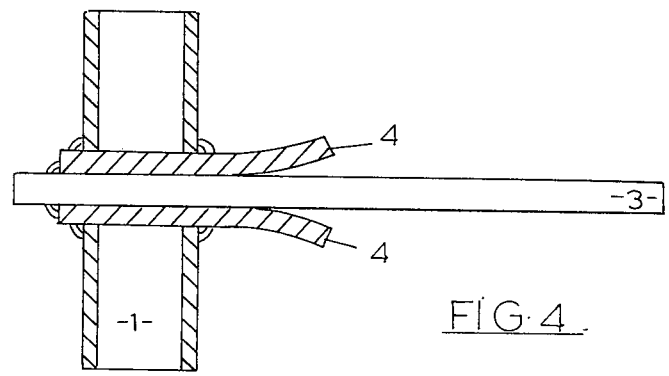
FIG. 4 shows partly in cross-section the same device as in FIG. 3 after heavy cyclic forces have been applied to it.

FIG. 4 shows the conformation of an absorber according to the pattern of FIG. 3 after it has been subjected to severe stressing. Guide bars 4 are permanently bent. When main beam 3 is again moved to make contact wiht the guide bars in their new position they can be deflected still further elastically about their present position. If they are stressed still more heavily they can be plastically moved to a new position which is still more deflected.

Since in the embodiment of FIG. 3 the axis of the main beam and of the guide bars and the line of action of the loads will all be in the same plane, these absorbers can be designed to take up only a small transverse space and can be put within a wall panel. The absorbers of FIG. 2 could also be used in this way but they are less suitable.

It is obvious that the embodiment of FIG. 3 can be considered as an extension of the embodiment of FIG. 2 in which a number of square beams lie side by side. This process may be extended by installing absorbers in multiple.

As an alternative, absorbers may be duplicated by joining two end-to-end. In FIG. 5 is shown an absorber which is effectively two of the embodiments of FIG. 2 joined by their free ends. The force-transfer means 5 and 6 are no longer needed. There are two anchors 1 and 11, a single main beam 3, and two sets of guide bars 4 and 14. The two anchors are rigidly fixed. One could be fixed to the foundation 2 and the other to the base 7 of a building. In FIG. 5 is shown also a development which is required in some circumstances, i.e. when a tall building on a small base is subjected to earthquake forces it may suffer uplift. The extensions 13 and 23 on the main beam 3 are continuous with main beam 3 and form a tensile member. Extension 13 is rigidly fixed within the building and extension 23 is rigidly fixed to the foundation. A number of units corresponding with FIG. 5, installed around the edge of a building, can be a safeguard against uplift.

Figure 6:
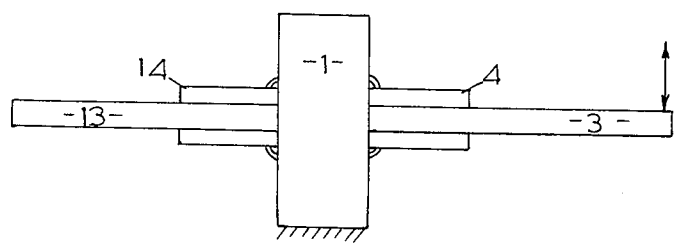
FIG. 6 shows a development of the device of FIG. 3, having one anchor about which two of the devices of FIG. 3 are symmetrically located, FIG. 7 bears the same relation to FIG. 2 that FIG. 6 bears to FIG. 4, showing a multi-directional double cantilever, flexural, hysteretic energy absorber with an anchor at its middle and a force connection at each end.
Figure 7:
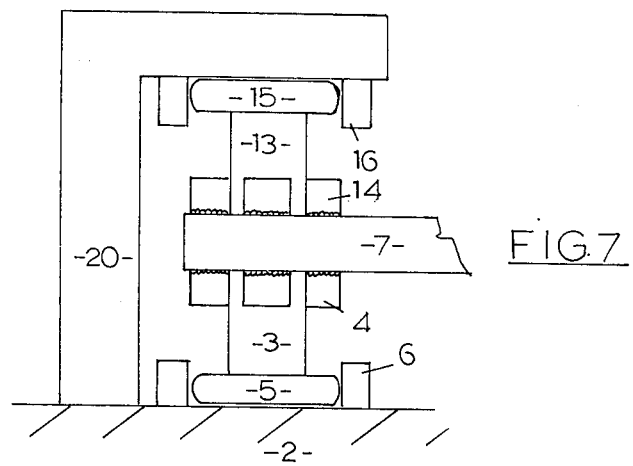

FIG. 6 shows a doubling of the pattern of FIG. 3. The anchor 1 is now the mid-point of a main beam 3/13 and rigidly fixed to it are guide bars 4 and 14. Force is applied at the two free ends of the main beam. It would be normal to arrange that the two ends were so connected that the forces applied were in phase and this reduces moments on the anchor 1. FIG. 7 shows a doubling of the pattern of FIG. 2, corresponding in general with the doubling of FIG. 3 which is shown in FIG. 6. The absorber is extended by a reflection about its base. At the middle of the main beam 3/13 is a connection 7 to one of the two members which move relative to each other and fitted to it are guide bars 4 and 14. 5/6 and 15/16 are symmetrical means for moving the main bar in phase at its two ends.

Figure 8:
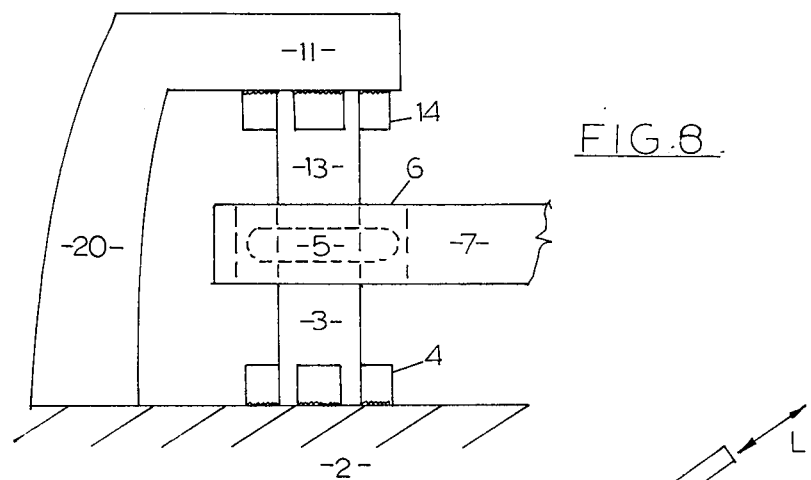
FIG. 8 is a schematic arrangement of the inverse of FIG. 7; a beam has anchors at each end and a force-applying means at its middle.

In FIG. 8, the pattern of FIG. 2 is duplicated by reflection about its free end. The anchor now comprises a bracket 20, similar to that which holds an upper force applying means 15/16 in FIG. 7. It now holds an upper anchor 11. The short cylinder 6 is replaced by a hole in a force applying bar 7. Guide bars are advantageous at the ends of the beam, and there should be some provision for axial motion of a beam end.

An energy absorber which contains one or more of the basic components may be designed for an endurance which lies in the range from a few tens of cycles to a few hundreds. It may be designed for an force from a few tens of Newtons to a few Mega-Newtons.

Figure 10:
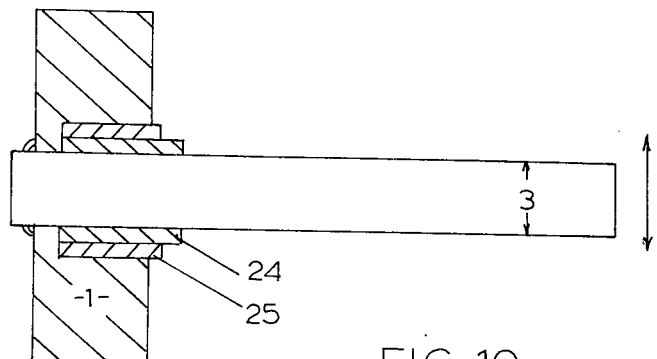
FIG. 10 shows a variant of FIG. 3 or FIG. 2 in which deformable materials are used to carry out the function of guide bars.

FIG. 10 shows a variation of FIG. 3 which is also applicable to FIG. 2. Guide bars 4 in both these Figures have been assumed to be of mild steel. FIG. 10 shows a pattern that has been found effective if a more readily deformable material such as lead is used. Bars 24 are of lead. Bars 25 may be of lead, or of steel if greater stiffness is wanted. It has been found that if both 24 and 25 are of lead, a region of decreasing strain is induced in that part of the main beam 3 adjacent to anchor 1.

Figure 11:
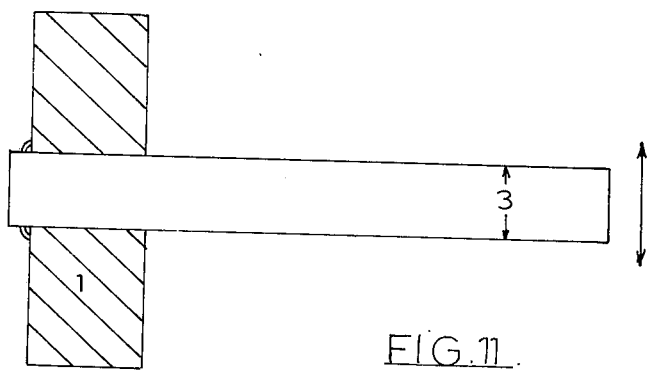
FIG. 11 shows a simplification of FIGS. 2 and 3 in which the rigidity of the anchor carries out the function of guide bars.

FIG. 11 shows a simplification that may be applied to the pattern of either FIG. 2 or FIG. 3. These Figures show a system of guide bars that involves rather expensive welding. In FIG. 11, increase of rigidity in the anchor (by thickening in the Figure, but other methods are possible) is, in a sense, a replacement for guide bars. It will be noted that beam 3 is welded only on the side of anchor 1 which is remote from the applied force. When a force is applied, the effect of the stiffness of the anchor is to increase the volume in which plastic strain occurs in beam 1, and decrease the concentration of strain in it.

Figure 9:
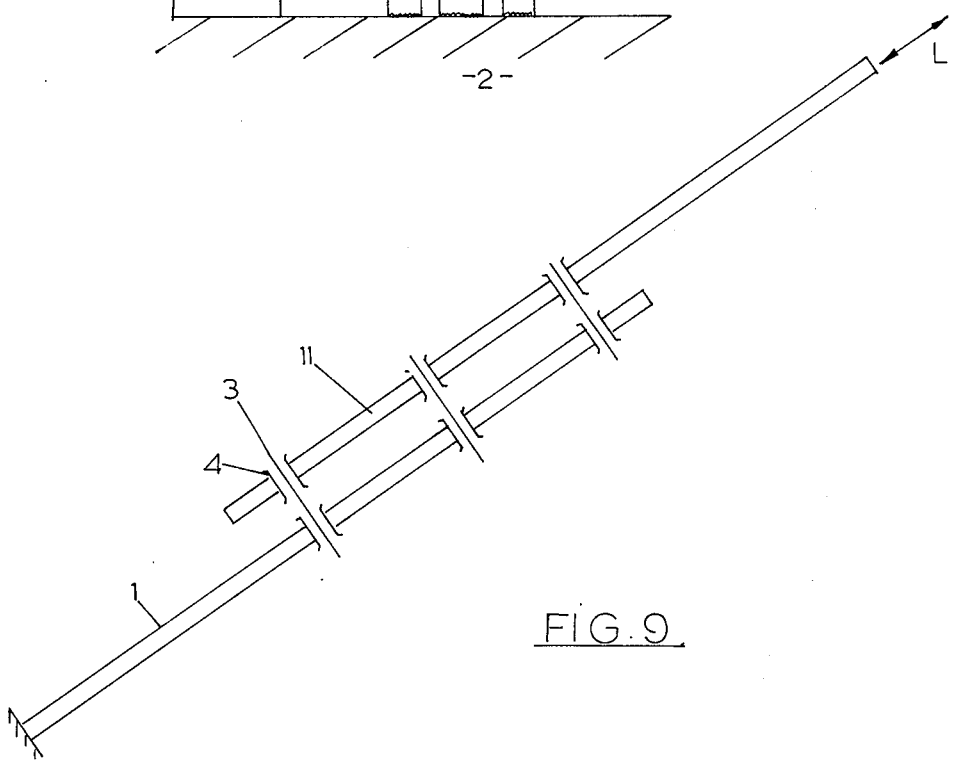
FIG. 9 shows a possible means of applying flexural, hysteretic energy absorbers for action along one line within the structure of a building, for instance in a diagonal brace; pairs of units of the type shown in FIG. 3 are joined by free ends of their main beams so forming the analogue of FIG. 5 for action along one line; a diagonal brace is divided and the two divided parts are joined by one or more of the double absorbers.

The energy absorbers have so far been discussed principally in relation to the absorption between a foundation and a structure above. A number of other applications have been envisaged and one of them is one of the two matters shown in FIG. 9. The first matter is a further extension of the device of FIG. 3. Two of these devices were taken and were joined at their free ends. They would be absorbers in relation to forces applied relatively at the two anchors. FIG. 9 shows a possible application for one or more of the double ended version of FIG. 3 to absorbing the energy with absorbers mounted in a diagonal brace in a framed structure.

Absorbers according to FIGS. 2 and 3 have a still further field of application. They can provide a component which is rigid when subjected to moderate loads, but is flexible when subjected to severe loads. They could in other words provide a cheap, compact but very stiff spring. The shape of response against applied force could be controlled by the relative proportions of the deformation beam and the guide bars.

In this description, the axes of a deformation beam and of guide bars are referred to as being perpendicular to the anchor so that they are fixed at a peripheral plane of the beam and guide bars, i.e. a plane perpendicular to the axis. This arrangement is not essential. The axes of the anchor and of the beam may be inclined to each other.

The forms of anchor so far described are somewhat particular. Other forms than those referred to may be used, so long as they hold the foot of the main deformable beam and the feet of the guide beams with what is effectively complete rigidity. The invention may in fact be considered to be a means of providing a beam adapted to bend under load, especially under cyclic load, and to be of such a composite form that at its anchor it is held with effectively absolute rigidity, and at a short distance away from its anchor it is so constrained by parts additional to the main beam and not attached to it that the stiffness of the additional parts, equal to the substantial part of the stiffness of the main beam, is added to that of the main beam. As a result, the maximum radius of curvature of the main beam is decreased and stress concentration is reduced. At the same time, relative motion between the main and subsidiary beams causes, by imposing surface compressive stresses, an increase in the fatigue strength of the main beam. It is considered that any conformation which will lead to the attainment of these objectives will lie within the present invention.

REFERENCES

1. Surface Stressing of Metals. Moore, Murray, Alman, Horger and Kosting. American Society for Metals, Cleveland, U.S.A. 1947 (p. 40–43).
2. Proceedings of the 44th Annual Meeting, June 1941 of the American Society for Testing Materials. American Society for Testing Materials, Vol. 41, 1941 (p. 672).

What we claim is:

1. A cyclic energy absorber designed to be interposed between first and second members of a structure which are caused by in-coming energy to move to-and-fro relative to each other, said energy absorber comprising in combination: a thick anchor extending laterally and adapted to be connected rigidly to a first member of the structure; a main beam approximately perpendicular to the lateral extension of the anchor, rigidly connected at one peripheral plane to a first face of said anchor and projecting through a close-fitting hole in said anchor; loading means hingably connecting a second member of the structure to the main beam at a point remote from the connection to said anchor so that relative to-and-fro motion in a direction approximately normal to the beam between said first and second members of the structure causes said main beam to deform cyclically in flexure into the plastic range in a region close to said anchor, and separate from said first face.

2. A cyclic energy absorber designed to be interposed between first and second members of a structure which are caused by in-coming energy to move to-and-fro relative to each other, said energy absorber comprising in combination: a thick anchor extending laterally and adapted to be connected rigidly to a first member of the structure; a main beam approximately perpendicular to said lateral extension of the anchor and rigidly connected at one peripheral plane to a first face of said anchor and projecting through a close-fitting hole in said anchor; a system of short guide bars with axes parallel to the axis of said main beam and initially in contact with it, rigidly connected to said anchor at a second face; loading means hingably connecting a second member of the structure to the main beam at a point remote from the connection to said anchor so that relative to-and-fro motion in a direction approximately normal to the beam between said first and second member of the structure causes said main beam to deform cyclically in flexure into the plastic range, in a region close to said anchor and separate from said first face and causes at least two of said guide bars to deflect permanently in flexure.

3. The combination defined in claim 2 wherein each guide bar projects from the anchor by approximately one-third of the projection of the main beam.

4. The combination defined in claim 2 wherein the main beam is a cylinder and the guide bars are cylindrical rods.

5. The combination defined in claim 2 wherein the main beam is a cylinder and the guide bar is a circumscribing cylinder.

6. The combination defined in claim 2 wherein the main beam is a cylinder and the guide bars are segments of a circumscribing cylinder.

7. The combination defined in claim 1 wherein the main beam has a cross-section which is a regular figure having at least three sides.

8. The combination defined in claim 2 wherein the main beam is a flat strip and guide bars are fitted on the two major faces.

9. The combination defined in claim 1 wherein the main beam is a cantilever.

10. The combination of claim 1 wherein two main beams are rigidly joined in line, whereby the to-and-fro motion is between the two ends of the composite beam moving in phase with each other, and the midpoint of the composite beam moving in antiphase with the two ends.

* * * * *